(12) United States Patent
Frohberger et al.

(10) Patent No.: US 9,235,381 B2
(45) Date of Patent: Jan. 12, 2016

(54) METHOD AND DEVICE FOR THE PROGRAMMING AND CONFIGURATION OF A PROGRAMMABLE LOGIC CONTROLLER

(71) Applicant: ABB AG, Mannheim (DE)

(72) Inventors: Anke Frohberger, Heidelberg (DE); Brigitte Blei, Berlin (DE); Christian Meyer, Laatzen (DE); Harald Staab, Laufach (DE); Thomas Reisinger, Mannheim (DE)

(73) Assignee: ABB AG, Mannheim (DE)

( * ) Notice: Subject to any disclaimer, the term of this patent is extended or adjusted under 35 U.S.C. 154(b) by 6 days.

(21) Appl. No.: 14/148,371

(22) Filed: Jan. 6, 2014

(65) Prior Publication Data

US 2014/0123104 A1    May 1, 2014

Related U.S. Application Data

(63) Continuation of application No. PCT/EP2012/002832, filed on Jul. 5, 2012.

(30) Foreign Application Priority Data

Jul. 6, 2011 (EP) .................................. 11005514

(51) Int. Cl.
*G06F 9/44* (2006.01)
*G06F 9/45* (2006.01)
*G05B 19/05* (2006.01)

(52) U.S. Cl.
CPC ................ *G06F 8/30* (2013.01); *G05B 19/056* (2013.01); *G05B 2219/13105* (2013.01); *G05B 2219/13123* (2013.01)

(58) Field of Classification Search
CPC .. G06F 8/33–8/38; G06F 8/30; G05B 19/056; G05B 2219/13105; G05B 2219/13123
See application file for complete search history.

(56) References Cited

U.S. PATENT DOCUMENTS

| | | | |
|---|---|---|---|
| 5,644,487 A | 7/1997 | Duff et al. | |
| 6,009,268 A | 12/1999 | Reis et al. | |
| 6,819,960 B1 * | 11/2004 | McKelvey | G05B 19/054 345/418 |

(Continued)

FOREIGN PATENT DOCUMENTS

EP    0 860 758 A1    8/1998

OTHER PUBLICATIONS

Assmaa A. Fahad, Design of an adaptable ladder editor for programmable logic controller, 2007, pp. 159-166.*

(Continued)

*Primary Examiner* — Thuy Dao
*Assistant Examiner* — Mongbao Nguyen
(74) *Attorney, Agent, or Firm* — Buchanan Ingersoll & Rooney PC

(57) ABSTRACT

A method and device for the programming and configuration of a programmable logic controller are disclosed. The method can include: locating a configuration tool in a programming tool, wherein the configuration tool includes a module in an IEC61131 language; integrating at least one further module into the configuration tool, and executing the programming and configuration of the programmable logic controller in a high-level language using a C-Code editor, and wherein the at least one further module is configured to provide a definition of interfaces between an IEC61131 code and a high-level language code, and provide a configuration of the high-level language code.

13 Claims, 7 Drawing Sheets

(56) References Cited

U.S. PATENT DOCUMENTS

| | | | | |
|---|---|---|---|---|
| 7,603,183 B1* | 10/2009 | Munemoto | G05B 19/05 | 700/17 |
| 7,761,848 B1* | 7/2010 | Chaffin | G06F 8/20 | 717/106 |
| 8,365,148 B2* | 1/2013 | Millmore | G06F 8/20 | 717/124 |
| 2006/0041324 A1* | 2/2006 | Chang | G05B 19/056 | 700/18 |
| 2006/0190106 A1* | 8/2006 | Kay | G05B 19/042 | 700/86 |
| 2007/0073426 A1* | 3/2007 | Chand | G05B 19/0426 | 700/87 |
| 2007/0250827 A1* | 10/2007 | Ohyama | G06F 8/30 | 717/162 |
| 2008/0127065 A1* | 5/2008 | Bryant | G05B 19/056 | 717/109 |
| 2009/0064103 A1* | 3/2009 | Shih | | 717/113 |
| 2009/0089671 A1* | 4/2009 | Bliss | G06F 8/30 | 715/700 |
| 2009/0198352 A1* | 8/2009 | Landgraf | G05B 19/0426 | 700/83 |
| 2010/0017036 A1* | 1/2010 | Sexton et al. | | 700/275 |
| 2010/0083220 A1* | 4/2010 | Chouinard et al. | | 717/108 |
| 2010/0083223 A1* | 4/2010 | Chouinard et al. | | 717/110 |
| 2010/0306736 A1* | 12/2010 | Bordelon | G06F 8/452 | 717/109 |
| 2012/0005667 A1* | 1/2012 | DeLuca | G06F 8/30 | 717/170 |
| 2012/0272215 A1* | 10/2012 | Chouinard et al. | | 717/124 |

OTHER PUBLICATIONS

Edouard Tisserant, An open source IEC 61131-3 Integrated Development Environment, 2007, pp. 1-5.*

Il Moon, Modeling Programmable Logic Controllers for Logic Verification, 1994, pp. 53-58.*

International Search Report (PCT/ISA/210) mailed on Nov. 28, 2012, by the European Patent Office as the International Searching Authority for International Application No. PCT/EP2012/002832.

* cited by examiner

METHOD AND DEVICE FOR THE PROGRAMMING AND CONFIGURATION OF A PROGRAMMABLE LOGIC CONTROLLER

RELATED APPLICATION(S)

This application claims priority as a continuation application under 35 U.S.C. §120 to PCT/EP2012/002832, which was filed as an International Application on Jul. 5, 2012, designating the U.S., and which claims priority to European Application No. 11005514.2 filed on Jul. 6, 2011. The entire content of these applications are hereby incorporated by reference in their entireties.

FIELD

The disclosure relates to a method and a system for the programming and configuration of a programmable logic controller, which can be used in the integration of intelligent field devices in a control or automation system, in process automation or in machine controls for controlling technical processes and/or plant components.

BACKGROUND INFORMATION

The basis for programming and configuring programmable logic controllers (PLC) can be, for example, the device-independent programming system according to the international standard IEC 61131-3 with the programming languages described there. Programming environments for programmable logic controllers can also allow the use of high-level languages such as BASIC, Java, C or C/C++/C#.

The programming and configuration of the programmable logic controllers can be implemented by means of a PC-based programming tool or programming device, also called engineering tool, as a sequence of individual program instructions, technologically or functionally associated program instructions in each case forming one program module, also called function block.

A complete PLC program can contain a multiplicity of such program modules. The modules can be input in one of the aforementioned PLC-application-related programming languages, for example, as an instruction list, as a contact plan, as a logic plan, as a function plan, as a sequence language or a structured text via the programming tool. There are PC-based tools for creating, translating, checking and downloading the PLC code into the devices of the automation system.

A method for inputting the program instructions in the high-level language "C" is, for example, described in EP 860 758 A1. An input device of the programming device is shown, which can be connected via a first data line to a converting device and can be connected via a second data line to a high-level language compiler, which can translate the program instructions into a code, which can be read or processed by the programmable logic controller.

On the product page of the company Bernecker+Rainer Industrie-Elektronik GmbH-B&R Automation Studio: "Integrated IEC 61131-3 Languages, CFC and ANSI-C" (see www.br-automation.com/cps/rde/xchg/br-productcatalogue/hs.xsl/products_151728 ENG HTML.htm), it is described that the programming language ANSI C can allow the users to call up function blocks and access addresses (global access variable) from other IEC languages.

Furthermore, there are solutions in which various source-file languages such as, for example, IEC61131, C/C++/C#, Basic or Java can be translated into an intermediate code and the intermediate code can then be retranslated in accordance with the producer-related target platforms of the devices used by means of an additional software component. This solution can be used, for example, by the company KW Software of the Phoenix Contact Gruppe and is shown by way of example in FIG. 1.

A further solution relates to the runtime system of the programmable logic controller according to IEC61131. In this context, the C Code functions can only call up variables with the programs described in IEC61131-3. Access to the system resources such as inputs and/or outputs or the memories of the devices connected to the programmable logic controller is not provided.

SUMMARY

A method for the programming and configuration of a programmable logic controller is disclosed, the method comprising: locating a configuration tool in a programming tool, wherein the configuration tool includes a module in an IEC61131 language; integrating at least one further module into the configuration tool; and executing the programming and configuration of the programmable logic controller in a high-level language using a C-Code editor, and wherein the at least one further module is configured to provide a definition of interfaces between an IEC61131 code and a high-level language code and a configuration of the high-level language code.

A device for the programming and configuration of a programmable logic controller is disclosed, the device comprising: a configuration tool located in a programming tool, wherein the configuration tool includes a module in an IEC61131 language; and at least one further integrated module configured for programming of the programmable logic controller in a high-level language by using a C-Code editor and for defining interfaces between an IEC61131 code and a high-level language code, and for configuration of the high-level language code.

BRIEF DESCRIPTION OF THE DRAWINGS

The disclosure is explained below with reference to the exemplary embodiments, shown in the drawings. In the drawings:

FIG. 3 shows an exemplary embodiment, the use of application modules from the libraries as source code which can be translated into binary format in the engineering tool or can be present as precompiled binary format which is only linked in;

FIG. 4 shows an exemplary embodiment, the use of application modules from the libraries as source code which is translated into binary format in the engineering tool or is present as precompiled binary format which is only linked in;

DETAILED DESCRIPTION

Figure 1:
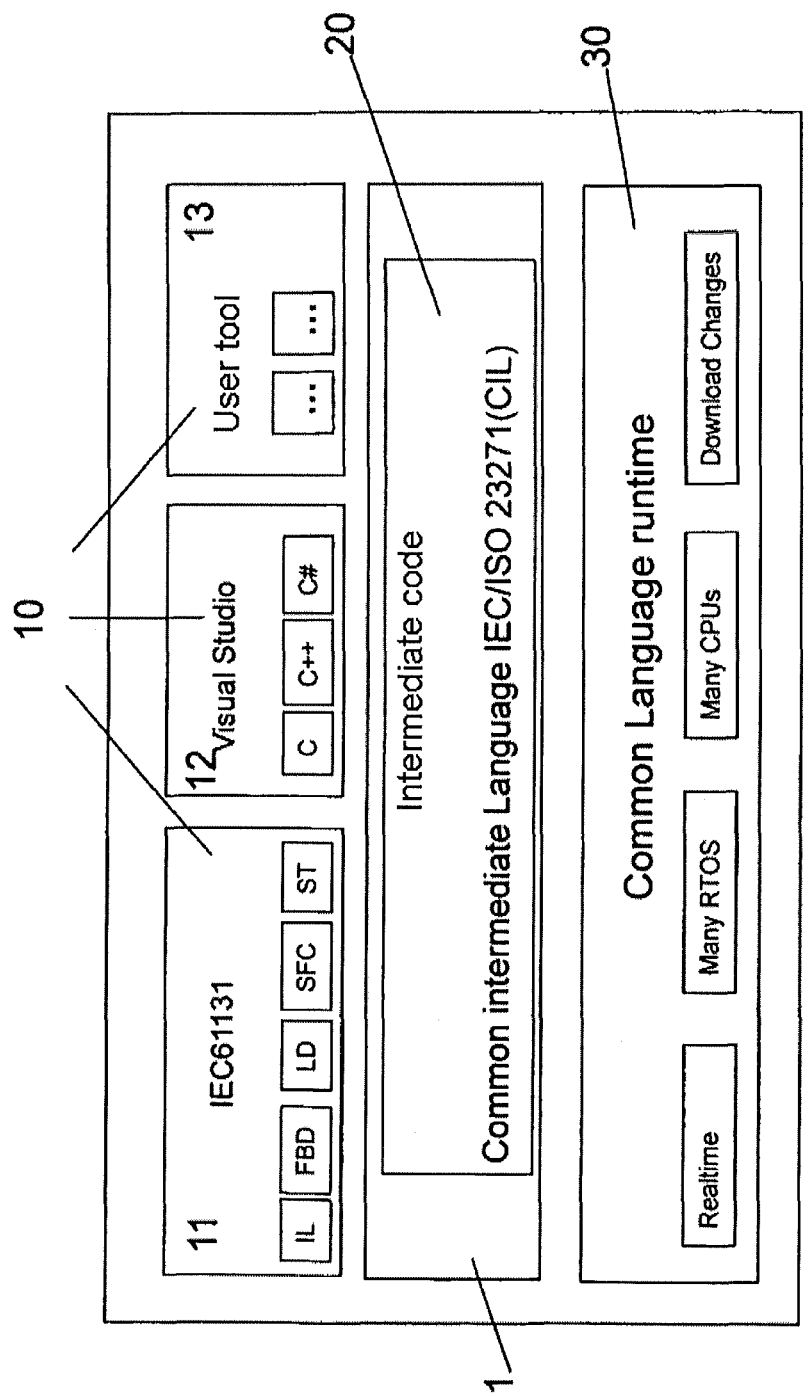
FIG. 1 shows a solution for programming a programmable logic controller by means of a programming tool according to known art.

The disclosure is based on specifying a method and a device by means of which the programming and configuration of a programmable logic controller can be simplified, wherein the program instructions created in a high-level language, for example, C Code run on the devices connected to the programmable logic controller in parallel with the program instructions generated according to IEC 61131-3 and by this means, direct access to the system resources such as inputs and/or outputs or the memories of the devices connected to the programmable logic controller can be executed. In accordance with an exemplary embodiment, for example, the user can edit code in the high-level language and in IEC61131 languages.

The method according to the disclosure for the programming and configuration of a programmable logic controller can be based on a configuration tool located in a programming tool, wherein in the configuration tool, apart from a module in an IEC61131 language, at least one further module can be integrated by means of which the programming of the programmable logic controller is executed in a high-level language by using a C-Code editor. By means of the further module, a definition of interfaces between an IEC61131 code and a high-level language code and the configuration of the high-level language code can be provided, according to the disclosure.

According to the disclosure, an additional module, also called plug-in, can be integrated in the configuration tool for carrying out the method according to the disclosure for the programming and configuration of the programmable logic controller by means of the configuration tool located in the programming tool, which additional module can generate and insert library functions in a high-level language, for example, C Code, for programming the controller, by which means the creation and integration of program instructions created in a high-level language into the devices of the automation system becomes executable in a simple manner.

According to the disclosure, a high-level language editor, a library management and an IEC 61131 interface (2A) can be integrated in the additional module.

In accordance with an exemplary embodiment, the library management can be used for setting up and managing user-defined libraries. In the library management, libraries can be configured initially with operating program modules, executable in a high-level language, for example C Code, together with corresponding compiler options as C-Code plug-in tab configuration.

Following this, a mapping of hardware devices connectable to the programmable logic controller with their inputs, outputs and/or local variables can be configured in the IEC 61131 interface in the high-level language as C-Code plug-in tab IEC61131 interface in a library project.

According to an exemplary method sequence, the plug-in tab configuration and the plug-in tab IEC61131 interface can be edited and stored in the additional module.

An application library can be generated from this in an application module not visible to the user by using a compiler and additional library-specific header files, and the generated application library can be added, not visibly to the user, to the target project code, stored in the programming tool, of the programmable logic controller. After that, the code can be generated in the corresponding high-level language for the target project to be carried out on the programmable logic controller in the programming tool and the program organization unit entities, also called program organization unit (POU) entities, contained therein can be implemented and transmitted from the programming tool together with the POUs for the IEC61131-3 applications into the programmable logic controller.

In accordance with an exemplary embodiment, the runtime environment for IEC and C Code can be divided into 2 runtime systems between which only a complex data exchange may be possible.

According to the disclosure, the sequence of the program instructions created under C Code can take place under a shell according to the IEC 61131 standard so that only this shell and not the C Code running in the background can be visible to the user. The access to the system resources can only be via the existing IEC 61131 interfaces. Accordingly, the runtime environment of a C-Code sequence appears like a sequence of the program instructions under an IEC 61131 environment.

According to the present disclosure, existing tested and proven interfaces of a program sequence according to the IEC 61131 standard can be adopted and, in consequence, a costly development of new C-Code-based interfaces can be omitted.

The method, described above, according to the present disclosure can allow the programmer to use his or her own C-Code programs or program instructions, only called C Code in the text which follows, within an IEC61131 project. For example, in this arrangement, the program instructions previously created in C Code can run in parallel with those of the IEC 61131-3 program instructions on the devices connected to the programmable logic controller. The system resources such as inputs and/or outputs or the memories of the devices connected to the programmable logic controller can be accessed directly.

In accordance with an exemplary embodiment, the disclosure can relate to a device and to a system for the programming and configuration of a programmable logic controller.

The device for the programming and configuration of the programmable logic controller can include a configuration tool located in a programming tool, in which, apart from a module (80) in an IEC61131 language, at least one further module can be integrated by means of which the programming of the programmable logic controller can be executed in a high-level language by using a C-Code editor and which can allow a definition of interfaces between an IEC61131 code and a high-level language code and the configuration of the high-level language code.

In accordance with an exemplary embodiment, an additional module can be integrated in the configuration tool of the controller development system into which additional module generated library functions in a high-level language, for example, C Code, can be inserted for programming the controller, as a result of which program instructions created in a high-level language can be created and integrated into the devices of the automation system in a simple manner.

For this purpose, the additional module can include a high-level language editor, for example a C-Code editor, a library management in which a library with program modules executable in the high-level language, for example C Code, can be specified or configured together with corresponding compiler options as high-level language add-on program of the tab configuration and can be used for setting up and managing user-defined libraries, an IEC 61131 interface in the high-level language, for example C Code, which can map the hardware devices, which can be connected to the controller, with their inputs, outputs and/or local variables in a library project. This interface is also called C-Code add-on program tab IEC61131 interface.

In accordance with an exemplary embodiment, the PC-based configuration tool can provide the user with the option of combining the various programming languages according to IEC 61131-3 and C. For this purpose, a selection unit or interface can be provided for the selection between programming by using a high-level language such as C Code or under the programming language based on IEC 61131-3.

Apart from a first application module or interface for programming according to IEC 6113-3, the programming tool can have a second application module or interface for programming in the programming language "C", switching between programming by using a high-level language such as, for example, C Code or under the programming language based on IEC 61131-3 being provided by means of a selection unit.

FIG. 1 shows a programming environment for a programmable logic controller or controller according to the known art, which can include various programming interfaces 10 based on the respective programming languages in which the programmer can be writing the corresponding software for the development and execution of the user programs. A first programming interface 11 can be provided for programming according to the IEC61131-3 standard. A second programming interface 12 can form an integrated development environment, for example, offered by the Microsoft® company, for various high-level languages such as, for example, C, C++, C#, which is called Visual Studio. By this means, the programmer can develop traditional Windows programs or dynamic web sites or web services for the Internet/Intranet, the main attention being focused on the creation of applications for the .NET framework, a software platform 1 based on the Common Language Runtime, developed by Microsoft.

The second programming interface 12 can interact with an intermediate language or intermediate code 20, called Common Intermediate Language (CIL), standardized in the meantime, stored on the software platform 1, which can translate the programs created and reproduces them already simplified.

The intermediate code 20 can be translated on an execution computer 30, also called target computer or target platform, from a runtime system (virtual execution system) 30 into the system's own program code, usually a machine code, in order to be able to thus execute the programs present in CIL 20 in the programmable logic controller.

In this context, the translation into the system's own program code can take place not directly but, firstly, a CIL Code 20 which specifies the corresponding program commands as a sequence of byte values is generated in a first step. The CIL Code 20 can be translated to native machine code and executed in a runtime system on the execution computer 30.

A third programming interface 13 can be provided as so-called user configuration tool for generating CIL Code 20.

Figure 2:
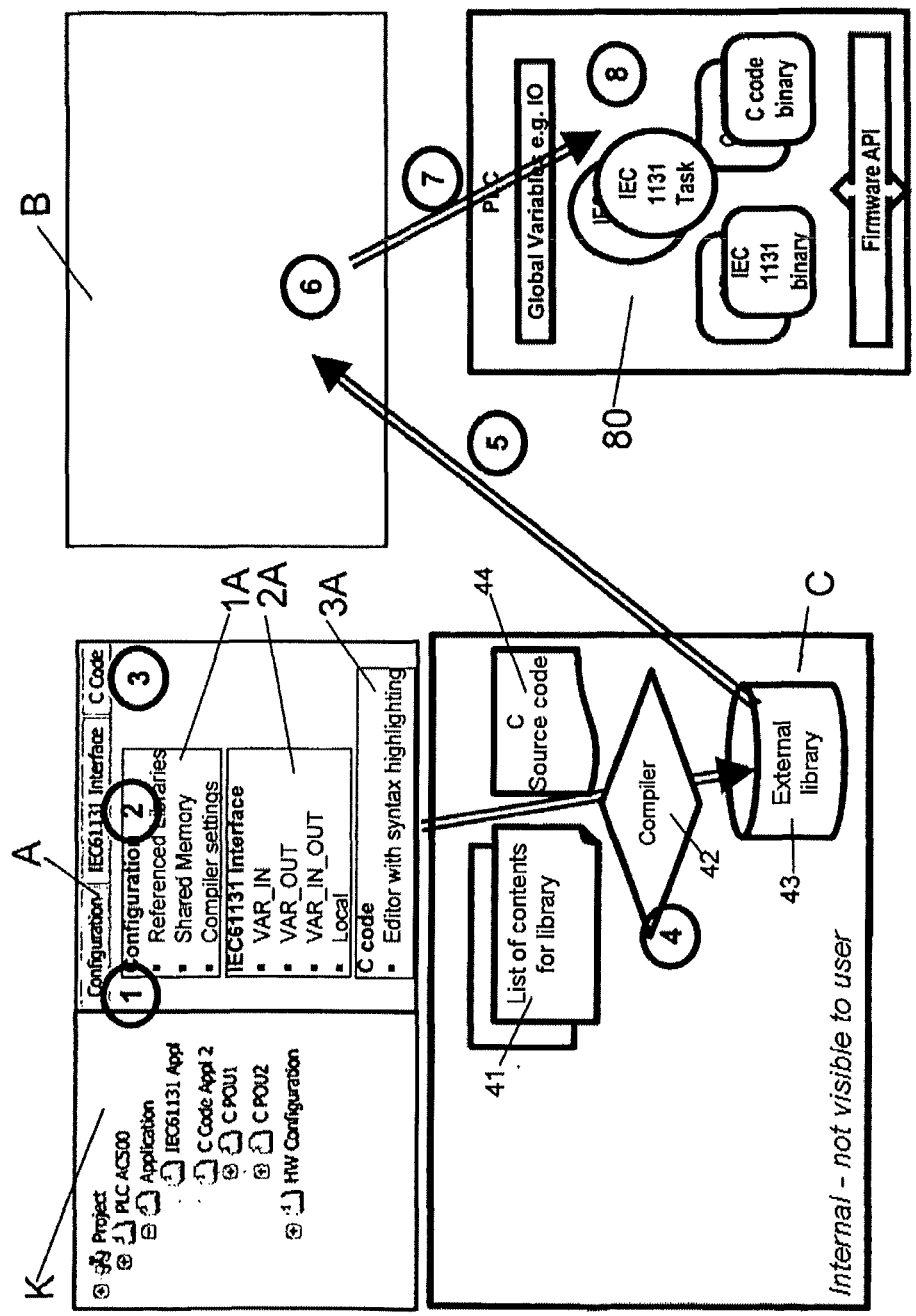
FIG. 2 shows an exemplary embodiment of the method according to the disclosure for the programming of a programmable logic controller.

FIG. 2 shows the features of the method according to the disclosure for the programming and configuration of a programmable logic controller D by means of a configuration tool K located in a programming tool B, by means of the method sequence with steps 1 to 8 by using an additional module A, which can also be called a plug-in, provided according to the disclosure.

The additional module A can include a C-Code editor 3A, a library management 1A in which a library with program modules executable in C Code can be specified or configured together with corresponding compiler options as C-Code add-on program, the tab configuration, an IEC 61131 interface 2A in C Code which maps the hardware devices connectable to the controller, with their inputs, outputs and/or local variables in a library project. This interface can also be called C-Code add-on program tab IEC61131 interface.

In a first step 1, libraries with operating program modules executable in C Code, together with corresponding compiler options, can be initially configured as C-Code plug-in tab configuration in the library management 1A.

In a second step 2, the IEC 61131 interface 2A can be configured in C Code for mapping hardware connectable to the programmable logic controller (D) with its inputs, outputs and/or local variables in a library project as C-Code plug-in tab IEC61131 interface and in a third step, the plug-in tab configuration and the plug-in tab IEC61131 interface is correspondingly edited and stored in the additional module A.

In a fourth step 4, an externally created application library 43, which can be translated into C Code in the background, that is to say invisibly to the user, from the present source code 44 in a compiler 42, using additional library-specific header files 41, can be provided in an application module, programmed in C Code, for the programming tool B.

After that, in a fifth step 5, the externally created application library 43 can be added to the target project code (PLC target project code) of the programmable logic controller D, which can be stored in the programming tool B. This method step, too, can run in the background.

In a next step 6, the C Code can be generated in the programming tool B for the program to be executed on the programmable logic controller, also called target project in the text which follows, and the program organization unit entities, contained therein, which include the entities of the programs, function blocks and functions, can be implemented.

In a step 7, the target project can now be loaded from the programming tool B to the programmable logic controller D, by which means a library of binary C-Code programs, also called C-Code library binary, can be linked in and loaded to the controller D.

In an optional step 8, the executable binary code (C-Code library binary) can be relocated from the runtime system of the programmable logic controller D and during this process, all external application program interface references (API references) can be resolved and linked. To access additional functions, which can be implemented in a firmware stored in the programmable logic controller, the C-Code POUs can call up a firmware API (application programming interface).

Since the firmware can be encapsulated in the C-Code header files 41, the user of the programmable logic controller only needs the functions, function modules and programs stored in C Code, that is to say no programming knowledge of the special firmware in each case.

It is also proposed that the PC-based programming tools B can have an interface, which can allow the programmer to select between programming in the high-level language and programming in IEC 61131.

By means of the method according to the disclosure, new functions (application modules) and also existing functions in the libraries can be implemented as C Code or in IEC 611131-3 languages and used combined in the target application.

In accordance with an exemplary embodiment, the method according to the disclosure can be based on the programming tool B provides external library POUs that can be implemented in C Code. The configurator used can support the plug-ins of the C-Code libraries, the IEC1131-3 interface specification, the C-Code editor and the compiler integration including the display of compiler errors and/or the integration of externally provided libraries in a target project of the PLC.

In an exemplary embodiment of the disclosure, system functions for C Code are not mapped as further application modules from the system libraries but mapped as application program interfaces, also called application programming interfaces (API), grouped into function areas for the firmware FW API.

Figure 3:
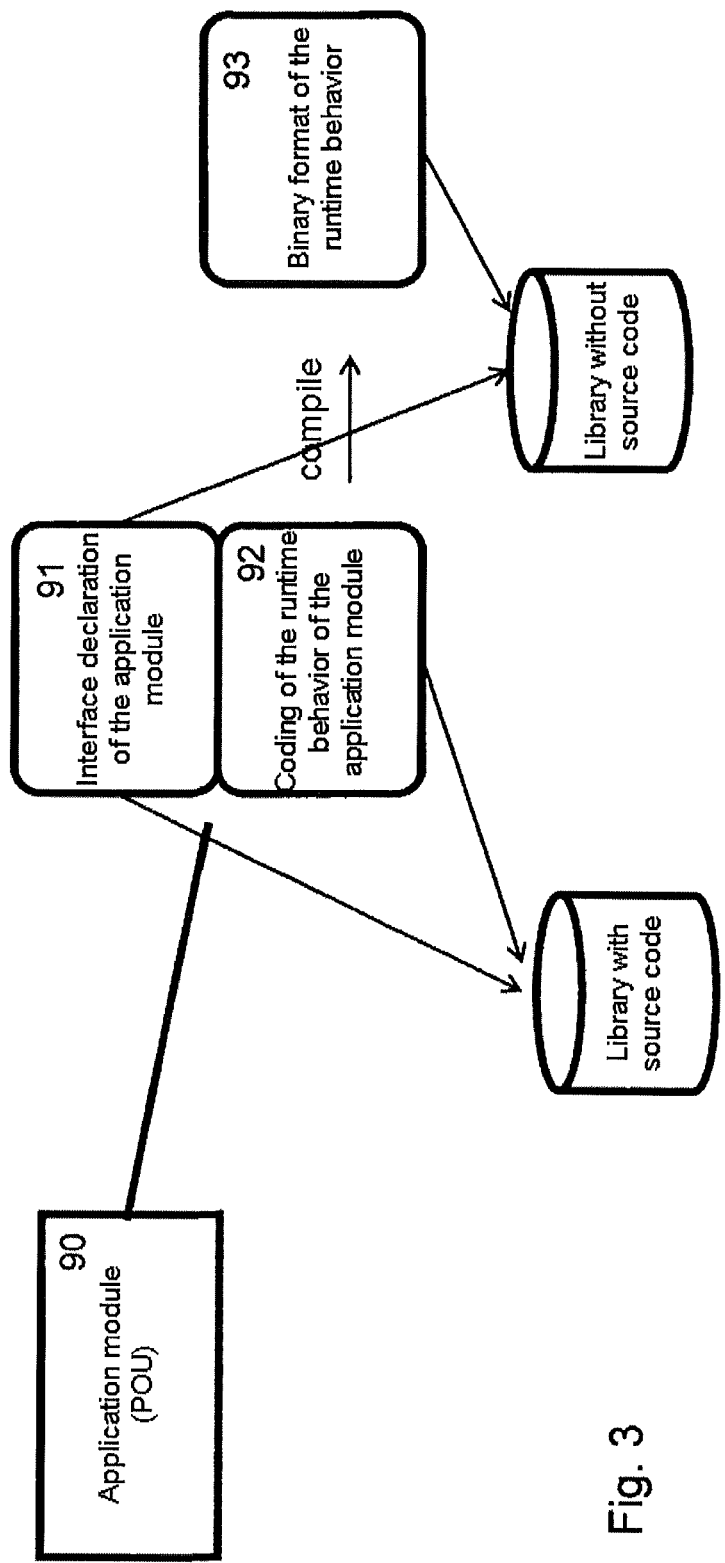
Figure 4:
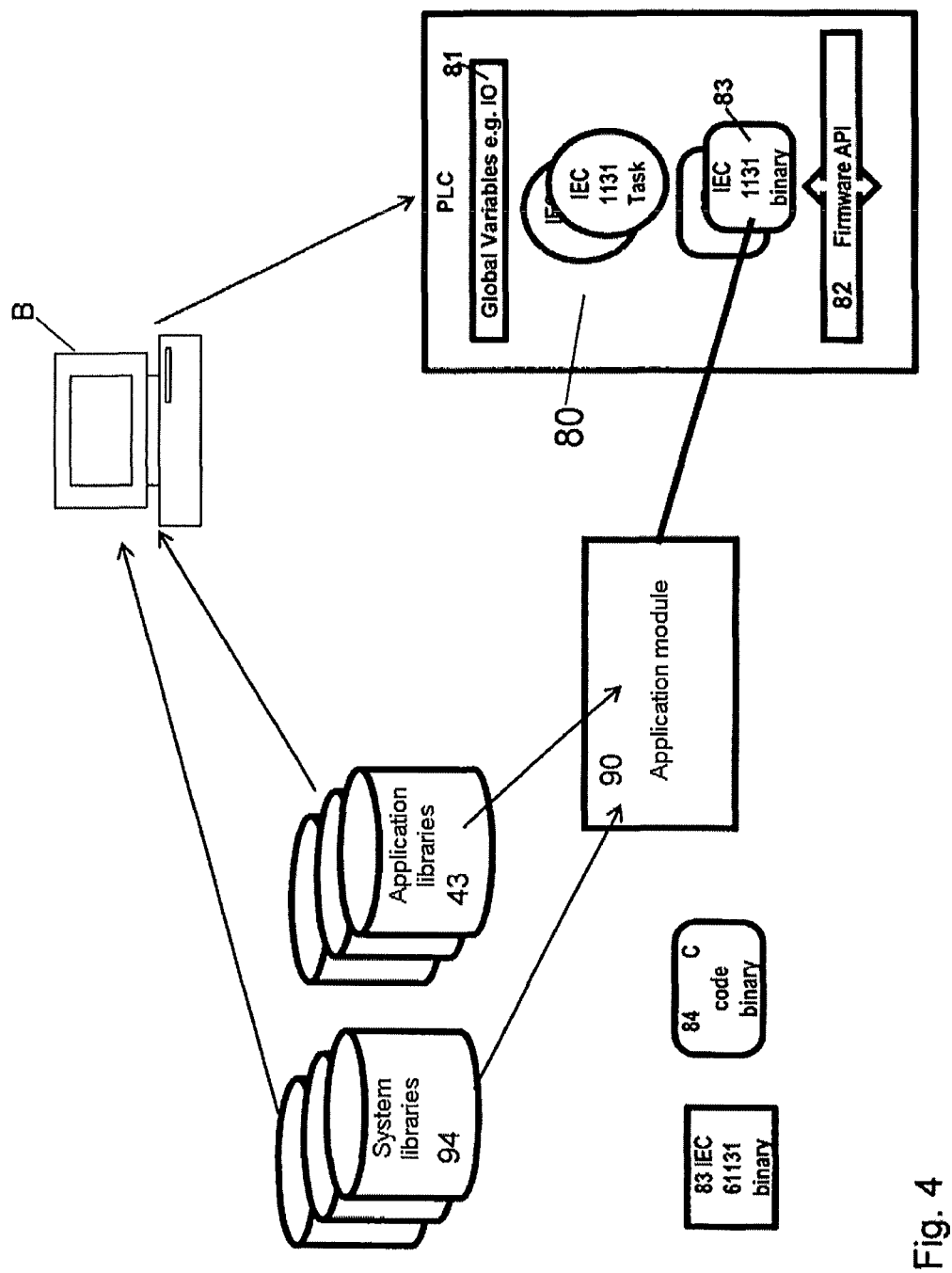

FIGS. 3 and 4 show an exemplary embodiment, of the use of application modules 90 from the system libraries 94 and the application libraries 43 as source code which can be translated (compiled) into binary format in the engineering tool B or can be present as precompiled binary format which is only linked in.

Figure 5:
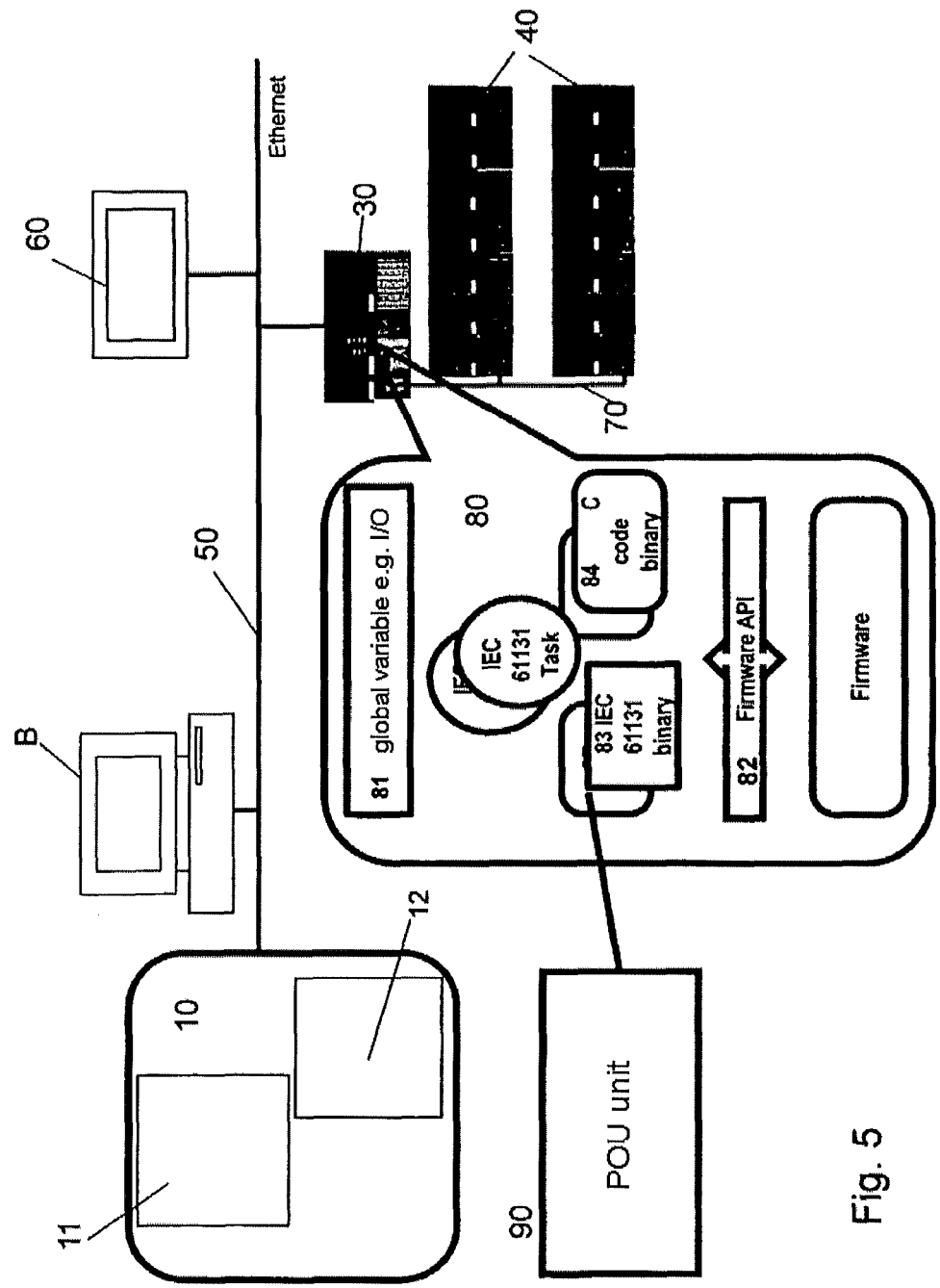
FIG. 5 shows an exemplary embodiment of a system structure of the C-Code integration by means of a programming tool.

FIG. 5 shows the system structure of the programmable logic controller for C-Code integration by means of a first programming interface 11, integrated in the programming tool B, for generating the configuration of a PLC project and a second programming interface 12. The first programming interface 11 can be provided for programming according to the IEC61131-3 standard and the second programming interface can be provided for programming in a high-level language, for example, C Code.

In accordance with an exemplary embodiment, before a programmable logic controller can be operational, the hardware devices 40 provided for it, especially intelligent field devices which can be connected to a controller 30 via communication couplers and a field bus 70, can be mapped in the programming tool B as component of an PLC or controller project, information about input/output addresses of these hardware devices 40 being stored in the controller project and made accessible to the user program. For example, so that the inputs and outputs of the hardware devices 40 of the system can be addressable, the controller and the input/output units of the hardware 40 can be firstly configured and a configuration of a PLC project, also called controller configuration, can be created as component of the PLC or controller project.

In accordance with an exemplary embodiment, the project configured with the programming interface 10 can be transmitted via an Ethernet bus 50, to which an operating unit 60 can also be connected, into the controller 30 of the programmable logic controller and from there via the field bus 70 into the field devices 40.

For the creation and configuration of the project, an application module 80 can be provided in the programming tool B as runtime environment in the programmable logic controller, in which global variable 81, application program interfaces 82, IEC61131-3 applications 83 and C-Code-based applications 84 are integrated which are provided for a transmission into the controller 30.

The IEC61131-3 applications 83 are organized in the POUs in a POU unit 90 interacting therewith, for example as special function block diagrams (FBD), structured text (ST), contact plans (LD), instruction lists (IL) and/or function plans (SFC, CFC). Additionally to the POUs for the IEC61131-3 applications 83, applications 84 C-Code-based such as FBD, ST, LD, IL, SFC, CFC can be implemented in the POU unit 90. The applications can be correspondingly composed, according to the disclosure, of application modules 83, 84 programmed in IEC61131-3 languages and programmed in C Code.

All inputs and/or outputs of the hardware devices 40 can be mapped as global variable 81 and all POUs 83, 84 share the global variable 81 so that the C-Code applications 84 can have access to the inputs and/or outputs via the interface of the POU unit 90.

System functions such as, for example, real-time functions, write and read files, memory administration, floating-point operations, real-time functions and real-time clock are not mapped as further application modules from the system libraries according to the disclosure, but grouped into function areas as application program interface (API) for the firmware FW API.

In order to implement the POU unit 90 in the C-Code applications 84, the generated application library 43 can be used. The library elements deposited in the application library 43 such as functions, function blocks and programs can be specified by the POU interface of the POU unit 90 according to the IEC61131-3 runtime system. In this context, the POU interface can define the connection points to other POUs, inputs and outputs and to the higher-level operating unit mapped as local variable such as, for example, variable of the input IN, output OUT and/or input/output IN-OUT type.

Each local POU variable created according to IEC61131-3 and in C-Code can be accessible and addressable via a PC access, for example the operating unit 60, or via a representation via the Internet.

The entire configuration of a PLC project, consisting of variables and tasks, the application modules which reference other application modules, can be loaded with the IEC61131-3 applications 83 and the C-Code-based applications 84 into the controller 30.

In accordance with an exemplary embodiment, since the system resources can only be accessed via the existing IEC 61131 interfaces, the runtime environment of a C-Code sequence can appear like a sequence of program instructions under an IEC-61131 environment. In accordance with an exemplary embodiment, separate downloading of the C-Code applications 84 into the controller 30 may not be needed.

Figure 6:
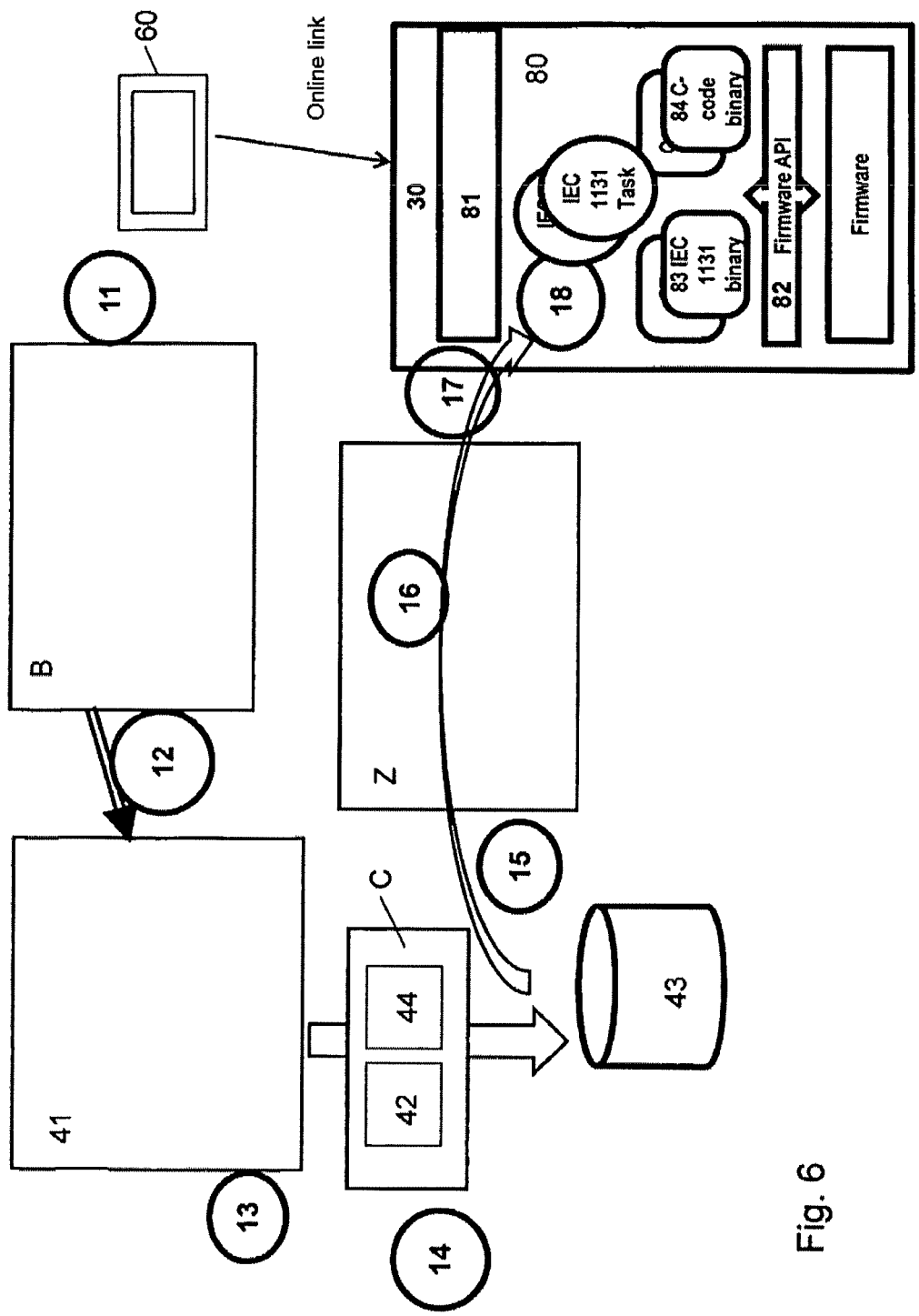
FIG. 6 shows an exemplary method sequence for the transmission of the created application library with the C-Code POU.

FIG. 6 shows an exemplary method sequence for the transmission of the created application library 43 with the C-Code POU. The additional module A for creating the application library 43 is not shown here.

In a first method step 11, a function block in the engineering tool B of the programmable logic controller can be specified with all of its inputs and outputs and all internal and local variables in a library project as C-Code plug-in tab IEC61131 interface and the library project can be stored in the engineering tool B. From the engineering tool B, the C-Code plug-in tab IEC61131 interface can be exported in a second method step 12 in the background to a header file 41 and a C-Code source file or frame (C file template).

In a third method step 13, the function block can be programmed in C Code by using the C-Code plug-in tab IEC61131 interface previously specified in the header file 41 and the C-Code source file, and in a fourth method step 14, the present C source code 44 can be translated into the corresponding binary code by means of the compiler 42.

After that, the application library 43 can be opened in the PLC target project Z in a next method step 15, and in a further method step 16, the function block entities can be generated in the target project Z.

The PLC target project Z can be loaded into the controller 30 in a following step 17, not visibly for the user, the applications 83, 84 can be joined to one another and the C-Code library binary can be downloaded. The C-Code library can contain the interface description 91 for application modules and either the source code of the runtime function 92 or only the executable binary code (binary) of the runtime function 93. This is shown, for example, in FIG. 3.

In a last method step 18, the executable binary code (C-Code library binary) can be linked in by the runtime system of the programmable logic controller D and the references to the FW API can be resolved or relocated. This is shown, for example, in FIG. 4.

Figure 7:
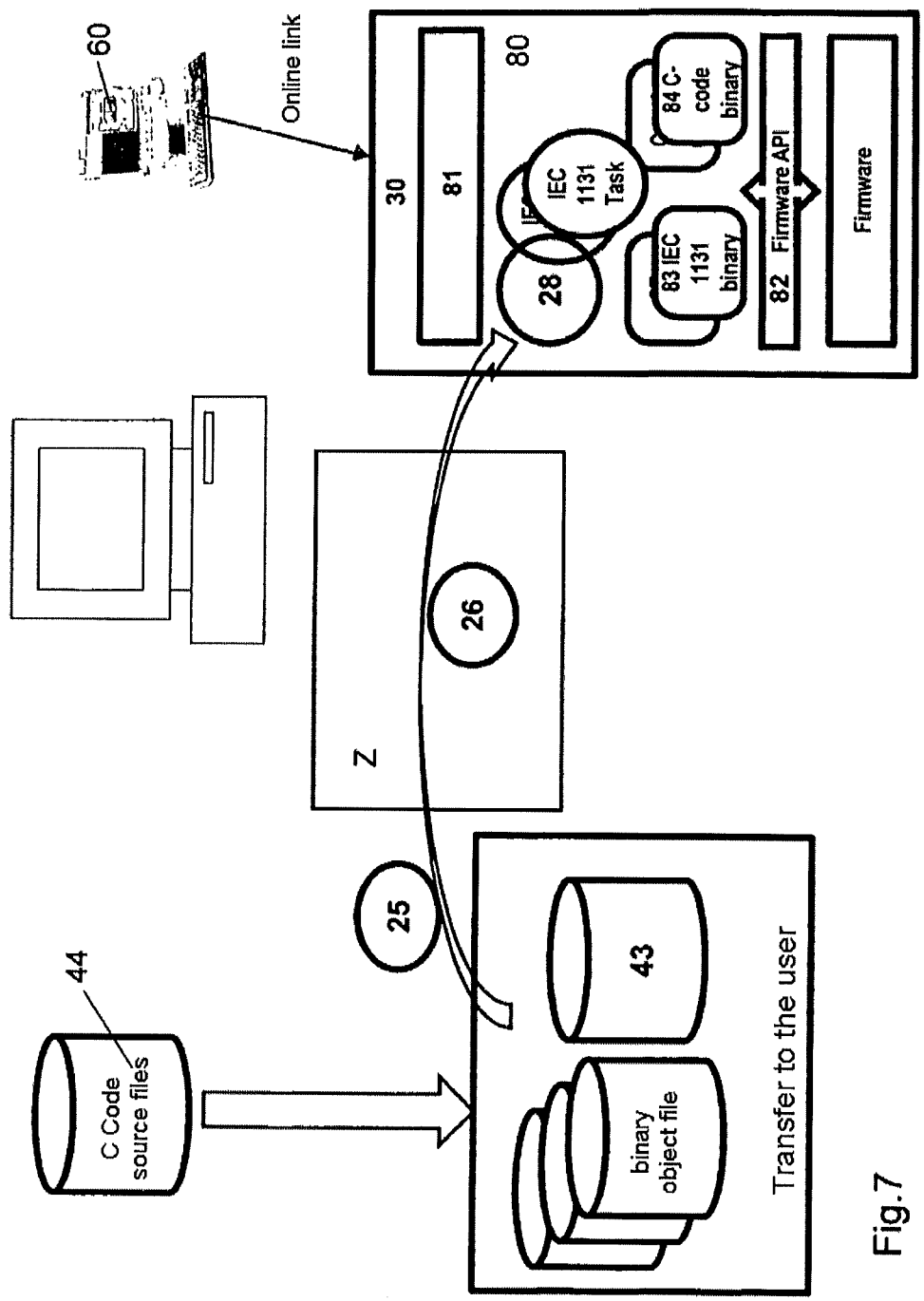
FIG. 7 shows a C-Code library, which is added to the target project code of the programmable logic controller.

FIG. 7 shows a C-Code library, which can be executed in C Code by using the C-Code source files 44 with a POU 90.

The created application library 43 can be added to the target project code (PLC target project code) Z of the programmable logic controller D in a step 25. In a next step 26, the C Code can be generated in the programming tool B for the target project to be executed on the programmable logic controller and the application module entities contained therein are implemented.

The target project can then be loaded from the programming tool B to the programmable logic controller D in a further step 28.

The application library 43 with the application modules, interface definition and the binary code generated from C Code can be reused advantageously in other projects without the source code files 44 being needed.

All POUs can now be implemented in the languages C Code or according to IEC61131-3 and share the global variables 81. This can provide direct access to the system resources such as inputs and/or outputs or the memories of the devices connected to the programmable logic controller and although there is programming in a high-level language, for example C Code, the programming world now only appears as IEC 61131-3 programming system for the user.

Due to the high-level language C Code used, too, the corresponding firmware application program interfaces (API) can be called up by utilizing the system libraries 94, the functions of the system libraries 94 including header files 41 can also be available to the C-Code programming.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE DESIGNATIONS

1 software platform
10 programming interface
11 first programming interface, first application module
12 second programming interface, second application module
13 third programming interface
20 intermediate language, intermediate code, Common Intermediate Language
30 execution computer, target platform
40 field device
41 header files
42 compiler
43 application library
44 source code
50 Ethernet bus
60 operating unit
70 field bus
80 application module
81 global variable
82 API, application program interfaces
83 IEC61131-3 applications
84 C-Code-based applications
90 POU unit
91 interface description
92 source code of the runtime function
93 executable binary code of the runtime function
94 system library
A additional module, plug-in
1A library management
2A IEC 61131 interface
3A C-Code editor
B programming tool, engineering tool
C application module with C-Code implementation
D programmable logic controller
K configuration tool
Z target project

What is claimed is:

1. A computer-implemented method for the programming and configuration of a programmable logic controller, the method comprising:
    locating a configuration tool in a programming tool, wherein the configuration tool includes a module in an IEC61131 language;
    integrating at least one further module into the configuration tool; and
    executing the programming and configuration of the programmable logic controller in a high-level language using a C-Code editor by means of the at least one module,
    wherein,
    wherein the at least one further module is configured to provide a definition of interfaces between an IEC61131 code and a high-level language code and a configuration of the high-level language code; and
    configuring the high-level language code by:
    providing a library management configured to set up user-defined libraries and to be managed using a high-level language;
    configuring a library project in the high-level language, wherein the library project includes a mapping of hardware connectable to the programmable logic controller in an IEC 61131-3 interface;
    editing the user-defined libraries and the library project using a high-level language editor and generating an application library from the user-defined libraries and the library project in an application module with C-Code implementation not visible to the user using a compiler and additional library-specific header files;
    adding the generated application library, which is not visible to the user, to the target project code, and
    storing the target project code and the generated application library in the programming tool of the programmable logic controller.

2. The method as claimed in claim 1, comprising:
    generating the code for the target project to be executed on the programmable logic controller in a corresponding high-level language; and
    implementing program organization unit (POU) entities contained in the code with POUs for IEC61131-3 applications; and
    loading the implemented POU entities contained in the code and the IEC61131-2 applications from the programming tool to the programmable logic controller.

3. The method as claimed in claim 1, comprising:
    relocating the library project created in the high-level language from the runtime system of the programmable logic controller and external application program interfaces are resolved.

4. The method as claimed in claim 2, comprising:
    relocating the library project created in the high-level language from the runtime system of the programmable logic controller and external application program interfaces are resolved.

5. The method as claimed in claim 2, comprising:
implementing the POUs for the IEC61131-3 applications and C-Code-based applications on the programmable logic controller.

6. The method as claimed in claim 1, wherein the high-level language is C or C/C++/C#.

7. The method as claimed in claim 1, comprising:
programming high-level language or according to the IEC 61131-3 programming system using an interface provided in the programming tool.

8. A device for the programming and configuration of a programmable logic controller, the device comprising:
a configuration tool located in a programming tool stored in a memory of the device, wherein the configuration tool includes a module in an IEC61131 language;
at least one further integrated module configured for programming of the programmable logic controller in a high-level language by using a C-Code editor and for defining interfaces between an IEC61131 code and a high-level language code, and for configuration of the high-level language code, and
a library management, wherein the library management is configured to set up and manage user-defined libraries using a high-level language;
an editable IEC 61131-3 interface, which is configured to map hardware devices connectable to the controller in a library project as C-Code plug-in tab IEC61131 interface in the high-level language, and wherein the further module is configured to store a configuration for the plug-in tab, which is editable using a high-level language editor, and the editable IEC61131 interface, in an application module with C-Code implementation; and
a compiler and additional library-specific header files configured to be stored, and the configuration tool being configured to use the compiler and additional library-specific header files for generating an application library from this for addition to a target project code, stored in the programming tool, of the programmable logic controller.

9. The device as claimed in claim 8, wherein the programming tool is configured to:
generate the target project code for the target project to be executed on the programmable logic controller in a corresponding high-level language;
implement program organization unit (POU) entities contained in the target project code with POUs for the IEC61131-3 applications; and
load the POU entries from the programming tool to the programmable logic controller.

10. The device as claimed in claim 9, comprising:
a POU unit, which is configured to implement the POU entries with C-Code-based applications.

11. The device as claimed in claim 8, wherein the high-level languages are C or C/C++/C#.

12. The device as claimed in claim 8, wherein the programming tool comprises:
a first application module configured to program according to IEC 6113-3; and
a second application module configured to:
program in the programming language "C"; and
switch between programming using the high-level language or under the IEC 61131-3-based programming language.

13. The device as claimed in claim 12, comprising:
a selection unit configured to switch between programming using the high-level language and the programming language based on the IEC 61131-3-based programming language.

* * * * *